United States Patent
Cox et al.

(10) Patent No.: US 12,466,346 B2
(45) Date of Patent: Nov. 11, 2025

(54) METHODS AND SYSTEMS FOR VEHICLE POWER CONTROL

(71) Applicant: Ford Global Technologies, LLC, Dearborn, MI (US)

(72) Inventors: David Cox, London (GB); David Hesketh, Ingatestone (GB); Emil G. Serban, Ann Arbor, MI (US); Mario Balenovic, Noord Brabant (NL); Bastian Hartmann, Hurth (DE)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 17/854,964

(22) Filed: Jun. 30, 2022

(65) Prior Publication Data

US 2024/0001872 A1   Jan. 4, 2024

(51) Int. Cl.
*B60R 16/023* (2006.01)
*B60L 58/20* (2019.01)

(52) U.S. Cl.
CPC .......... *B60R 16/0232* (2013.01); *B60L 58/20* (2019.02); *B60L 2210/10* (2013.01)

(58) Field of Classification Search
CPC ... B60R 16/0232; B60L 58/20; B60L 2210/10
USPC .......................................................... 307/9.1
See application file for complete search history.

(56) References Cited

U.S. PATENT DOCUMENTS

| 10,914,212 | B1 | 2/2021 | Bargman et al. |
| 11,110,872 | B2 | 9/2021 | Kurihara et al. |
| 2004/0124703 | A1* | 7/2004 | Tani .................... B60R 16/0315 307/10.1 |
| 2004/0164616 | A1* | 8/2004 | Obayashi ................. B60K 6/46 307/18 |
| 2011/0231042 | A1* | 9/2011 | Ueda ..................... B60L 3/0084 903/902 |
| 2019/0296546 | A1 | 9/2019 | Smith |
| 2020/0016979 | A1* | 1/2020 | Awad Alla .............. B60L 58/20 |

FOREIGN PATENT DOCUMENTS

| JP | 2008110700 A | 5/2008 |
| JP | 6292113 B2 | 2/2018 |

* cited by examiner

*Primary Examiner* — Daniel Kessie
*Assistant Examiner* — Dru M Parries
(74) *Attorney, Agent, or Firm* — HALEY GUILIANO LLP

(57) ABSTRACT

Methods and system are disclosed for vehicle power control. a first high voltage, HV, demand signal is received from a HV device and a first low voltage, LV, demand signal is received from a LV system of the vehicle. The first HV demand signal can be modified based on the first LV demand signal. An input HV supply is received from an e-machine based on the first LV demand signal and modified HV demand signal. An output LV supply is provided from a first DCDC converter to the LV system of the vehicle and an output HV supply is provided from a second DCDC converter to the HV device.

18 Claims, 10 Drawing Sheets

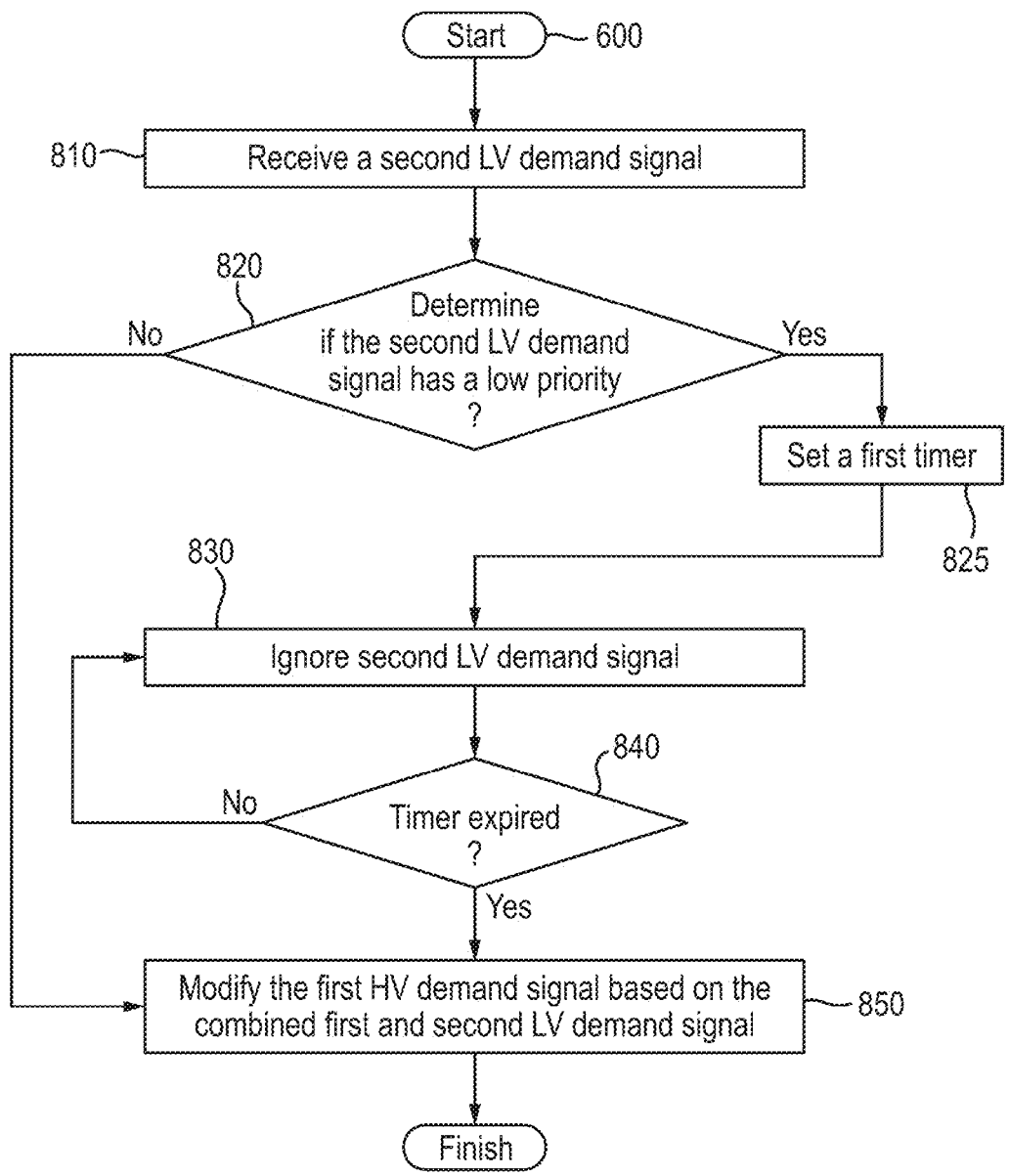

METHODS AND SYSTEMS FOR VEHICLE POWER CONTROL

FIELD OF INVENTION

The present disclosure relates to methods and systems of controlling vehicle power systems and vehicles comprising said systems. More particularly, but not exclusively, the present disclosure relates to providing a power control unit for control of one or more DC-DC converters in a multi-level power system, such as a hybrid vehicle, without a high voltage (e.g., 48V-60V) battery.

BACKGROUND

Mildly hybrid electric vehicles (mHEVs) typically have a plurality of high voltage (e.g., 48V) components that are powered by an appropriate hybrid battery and bus system (e.g., a 48V battery). Typical high voltage components are such devices as water pumps, air pumps, an electrical exhaust gas heater (eEGH), or high voltage user devices that are powered using DC or, after transformation, AC power. Vehicles also have a plurality of low voltage (e.g., 12V) components such as lights, windshield heaters, carseat heaters, airconditioning, power steering, and the like. Each component, both high voltage and low voltage components alike, may have an associated priority, based on essentiality to vehicle operation (e.g., power steering), regulations (e.g., emissions), or comfort devices (e.g., heated seats). For example, an eEGH may be used assist catalyst light-off and to maintain optimal catalyst temperature to meet emission standards. Typically, the required eEGH power (~4 kW), in combination with low voltage vehicle loads, can't be satisfied by a conventional low voltage power supply system. That is, a conventional low voltage alternator-based system would not satisfy the combined output power requirement of the low voltage vehicle systems and the eEGH.

Vehicles that are not hybridized would therefore require a hybrid system (such as a conventional 48V mild-hybrid system) comprising an appropriate high voltage battery to support the combined eEGH and 12V (i.e., low voltage) loads. This results in a significant cost impact and integration challenges based on packaging and weight. With such integrations, power supply to the eEGH and 12V vehicle systems is typically prioritized over traditional hybrid functions such as improved fuel economy. As such, the cost of such a power supply system would be the same as a conventional mild hybrid system, but with less functionality. The largest, heaviest, and costliest element of the system is the 48V battery. Thus, removing the 48V battery is desirable. However, without the battery in the electrical circuit, there is a risk of bus voltage instability as all transient power demands of the 12V vehicle systems may not be satisfied or managed solely with an e-machine.

Moreover, torque ripple or fluctuations in torque may result in a degradation in noise/vibration/harshness (NVH) and drivability. In addition, this can lead to high voltage (e.g, 48V) system voltage collapse; and devices/modules deactivating or being damaged if an under/overvolt condition is reached. The severity of a bus collapse is significant as this could result in a Quit-on Road event. Therefore, there is a need to provide an improved vehicle interface system which addresses these problems and a need to achieve a system that maintains traditional mildly Hybrid Electric Vehicle (mHEV) system performance, including output power, without a high voltage battery.

SUMMARY

Accordingly, there are proposed herein systems and methods that enable a system without a high voltage (e.g., 48V) battery to satisfy the electrical loads (power) of the low voltage (e.g., 12V) and high voltage (e.g., 48V) components. as described in more detail below. Put another way, mHEV system performance is maintained even though the battery is deleted, providing a system that is not package constrained, not as heavy, and a lower cost.

According to some aspects of the present invention, there is provided a method comprising receiving a first high voltage, HV, demand signal from a HV device and a first low voltage, LV, demand signal from a LV system of the vehicle, modifying the first HV demand signal based on the first LV demand signal, receiving an input HV supply from an e-machine based on the first LV demand signal and modified HV demand signal, and providing an output LV supply from a first DCDC converter to the LV system of the vehicle and an output HV supply from a second DCDC converter to the HV device.

In some examples, the method further comprises synchronizing response rates between the first DCDC converter and the second DCDC converter. In some examples, the method comprises synchronizing slew rates between the first DCDC converter and the second DCDC converter.

In some examples, the first DCDC converter and second DCDC converter are housed in a single DCDC converter unit.

In some examples, the method comprises modifying the first HV demand signal by reducing a response rate of the HV device. In some examples, the method comprises modulating a voltage of the HV device based on the LV demand signal.

In some examples, the method comprises determining there is torque overhead at the e-machine, creating a second HV demand signal based on the torque overhead, wherein the second HV demand signal has a greater slew rate than the modified HV signal but a lesser slew rate than the first HV demand signal, and receiving an input HV supply from the e-machine based on the first LV demand signal and the second HV demand signal.

In some examples, the method further comprises receiving a second LV demand signal, determining that the second LV demand signal has a low priority, ignoring the second LV demand signal for a first time period, and upon expiry of the first time period, modifying the first HV demand signal based on the combined first and second LV demand signal.

In some examples, the method further comprises operating a controller to selectively supply power from a capacitance module to the vehicle power system.

In some examples, the e-machine includes a torque reserve configured to support transient demands of the LV electronics system.

In some examples, the e-machine is a belt integrated starter generator, BISG.

In some examples, the HV device is an electrical exhaust gas heater.

According to one aspect of the present invention there is provided a power system for a vehicle. The power system comprises a high voltage, HV, e-machine coupled to an engine; a HV device; a low voltage, LV, system of the vehicle; a first DCDC converter configured to convert an input HV supply from the e-machine to an output LV supply; a second DCDC converter configured to convert an input HV supply from the e-machine to an output HV supply, and a controller configured to: receive a first high voltage, HV, demand signal from the HV device and a first low voltage, LV, demand signal from the LV system of the vehicle; modify the first HV demand signal based on the first LV demand signal; instruct the first DCDC converter to provide an output LV supply to the LV system of the vehicle, and instruct the second DCDC converter to provide an output HV supply to the HV device.

In some examples, the power system further comprises a capacitance module operably connectable to the vehicle power system.

According to one aspect of the present invention, a vehicle comprising a power system is provided. In some examples, the power system of the vehicle comprises a high voltage, HV, e-machine coupled to an engine; a HV device; a low voltage, LV, system of the vehicle; a first DCDC converter configured to convert an input HV supply from the e-machine to an output LV supply; a second DCDC converter configured to convert an input HV supply from the e-machine to an output HV supply, and a controller configured to: receive a first high voltage, HV, demand signal from the HV device and a first low voltage, LV, demand signal from the LV system of the vehicle; modify the first HV demand signal based on the first LV demand signal; instruct the first DCDC converter to provide an output LV supply to the LV system of the vehicle; and instruct the second DCDC converter to provide an output HV supply to the HV device.

According to one aspect of the present invention, there is provided a non-transitory computer-readable medium having instructions encoded thereon for vehicle power control which, when executed, carry out a method. In some examples, the method comprises receiving a first high voltage, HV, demand signal from a HV device and a first low voltage, LV, demand signal from a LV system of the vehicle; modifying the first HV demand signal based on the first LV demand signal; receiving an input HV supply from an e-machine based on the first LV demand signal and modified HV demand signal; and providing an output LV supply from a first DCDC converter to the LV system of the vehicle and an output HV supply from a second DCDC converter to the HV device.

According to one aspect of the present invention, a computer-readable medium is provided. The computer-readable may include instructions which, when executed by a processor, cause the processor to perform the steps of receiving a first high voltage, HV, demand signal from a HV device and a first low voltage, LV, demand signal from a LV system of the vehicle; modifying the first HV demand signal based on the first LV demand signal; receiving an input HV supply from an e-machine based on the first LV demand signal and modified HV demand signal; and providing an output LV supply from a first DCDC converter to the LV system of the vehicle and an output HV supply from a second DCDC converter to the HV device.

These examples and other aspects of the disclosure will be apparent and elucidated with reference to the example(s) described hereinafter. It should also be appreciated that particular combinations of the various examples and features described above and below are often illustrative and any other possible combination of such examples and features are also intended, notwithstanding those combinations that are clearly intended as mutually exclusive.

BRIEF DESCRIPTION OF THE DRAWINGS

The above and other objects and advantages of the disclosure will be apparent upon consideration of the following detailed description, taken in conjunction with the accompanying drawings, in which:

FIG. 8 illustrates an example flowchart of a method for receiving a second low voltage demand signal, in accordance with some examples of the disclosure.

The figures herein depict various examples of the disclosed disclosure for purposes of illustration only. It shall be appreciated that additional or alternative structures, systems and methods may be implemented within the principles set out by the present disclosure.

DETAILED DESCRIPTION

Figure 1:
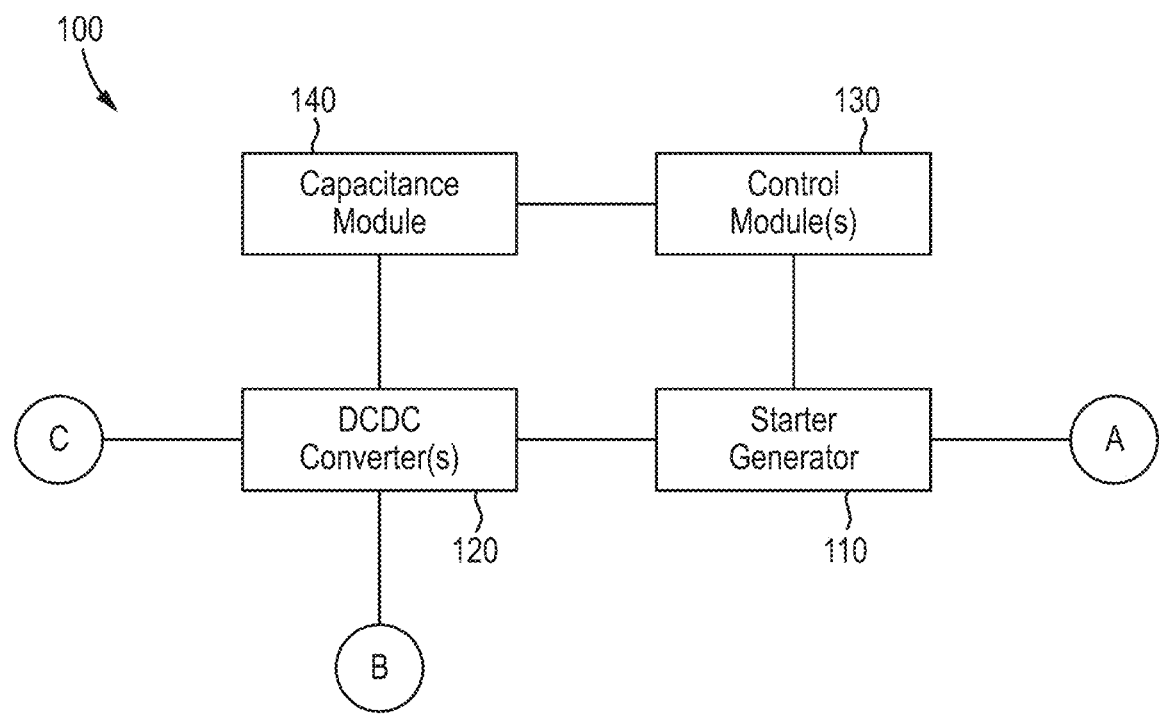
FIG. 1 illustrates an exemplary block diagram of a vehicle power system, in accordance with some examples of the disclosure.

FIG. 1 shows a block diagram of a power system 100, in accordance with some examples of the disclosure. The power system 100, which comprises a starter generator 110, one or more DCDC converters 120, a control module 130 and, optionally, a capacitance module 140. The starter generator 110 may be an e-machine, such as a belt integrated starter generator (BISG), mechanically coupled to an engine, replaced for simplicity in FIG. 1 by a reference symbol "A". The one or more DCDC converters 120 are electronically coupled to at least two loads, a high voltage (HV) load and a low voltage (LV) load. The HV load or HV electronics system is represented for simplicity by reference symbol "B". The LV load or LV electronics system is represented for simplicity by reference symbol "C". Notably, this system comprises no HV battery component.

The LV electronics system includes all electronic components of the vehicle relating to vehicle control and driver interaction. For example, the LV electronics system may include components such as power steering, external lights and indicators, windscreen wiper motors, air conditioning, driver entertainment system (e.g. radio, multimedia audio system), driver interface system (e.g. speedometer, tachometer, odometer), electric windows, central locking, immobiliser system, heaters (e.g. air heaters, window heaters, seat heaters), etc.

The LV electronics system comprises a LV battery e.g. a lead-acid battery or a lithium-ion battery. In some examples, the low-voltage level may be 12V or 24V. Alternatively, in some examples, the low-voltage level may be 14V or 9V or any other suitable voltage level for the electronics system.

In some examples, the HV device may be an electrical exhaust gas heater (eEGH). The eEGH may be configured to maintain an optimal catalyst temperature for a catalytic converter. In some examples, the eEGH may require high power, in comparison with components of the LV electronics system. For example, the eEGH may require approximately 4 kW. As such, in some examples, the high voltage level of the HV device may be 48V. In some examples, the HV device may be e.g. a different heater, a water pump, or a motor/actuator (e.g. for a winch or lifting mechanism). The HV device (i.e., HV component) is not a HV battery.

The starter generator 110 is coupled to an engine. The starter generator 110 is a motor/generator configured to provide a driving torque to the engine when supplied with power and also to generate an output power when driven by the engine. In some examples, the starter generator 110 is a high voltage e-machine. That is, the output power from the starter generator 110 may be generated at a high voltage, e.g., at 48V. In some examples, the starter generator 110 may be a belt integrated starter generator, BISG. That is, the starter generator 110 may be incorporated into a drivetrain of the vehicle using a belt drive. The BISG may include an integrated inverter to output DC power.

The DCDC converter 120 is configured to convert the output power from an e-machine (i.e., starter generator 110) to a usable power supply for the LV electronics system and/or the HV device. In some examples, the DCDC converter 110 may include a first HV-LV converter and a second HV-HV converter. Alternatively, the HV-LV converter and HV-HV converter may be integrated into a single DCDC converter.

The first HV-LV converter may be configured to convert the HV output power from the e-machine to a LV power supply for the LV electronics system. For example, the first HV-LV converter may step down the voltage from 48V output by the e-machine to 12V for supply to the LV electronics system.

The second HV-HV converter may be configured to convert the HV output power from the e-machine to a HV power supply for the HV device. For example, the second HV-HV converter may convert the voltage from 48V output by the e-machine to 48V for supply to the LV electronics system.

The control module 130 is configured to control the DCDC converter 120. The control module 130 may be a stand-alone controller or any other appropriate controller for a vehicle, such as a hybrid vehicle. For example, the control module 130 may, at least in part, be integrated with another controller of the vehicle. Furthermore, the control module 130 may be configured to operationally communicate with any one or more of the vehicle components, and/or any other appropriate components of the vehicle. For example, control module 130 may be a stand-alone controller configured to operationally communicate with at least one HV device and an e-machine, to control the electrical power output of the one or more DCDC converter 120.

The control module 130 is further configured to receiving a first high voltage, HV, demand signal from a HV device and a first low voltage, LV, demand signal from a LV system of the vehicle. The HV demand signal may include a demand from the eEGH. For example, the eEGH may demand power to increase the catalyst temperature of a catalytic converter in the vehicle. The eEGH may increase the catalyst temperature to a preset level e.g. based on the current catalyst temperature, or based on the operation of the engine, or based on the detection of emissions in the exhaust.

Figure 2:
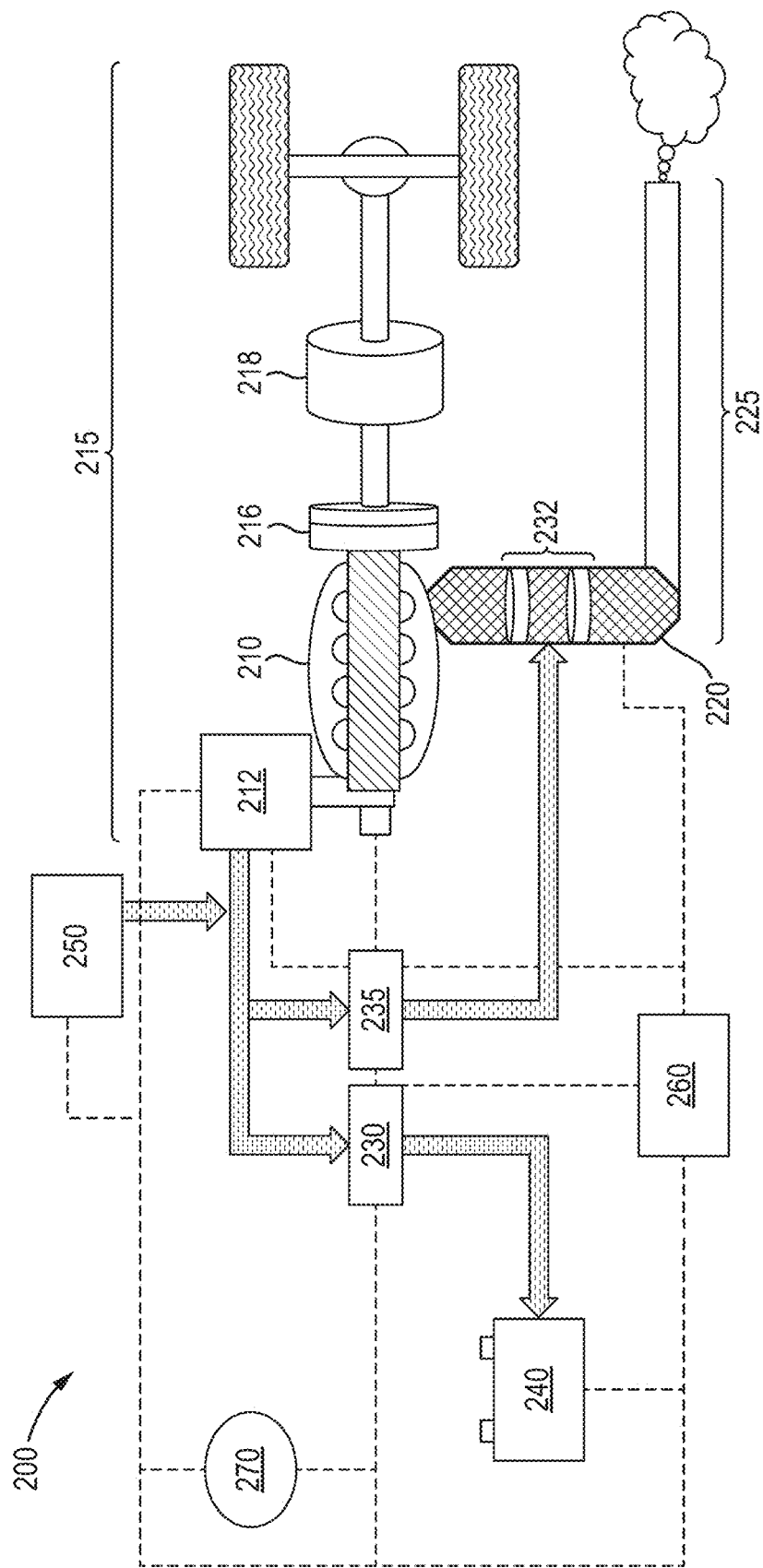
FIG. 2 shows a block diagram representing an electrical power control system for a hybrid vehicle, in accordance with some examples of the disclosure.
Figure 3:
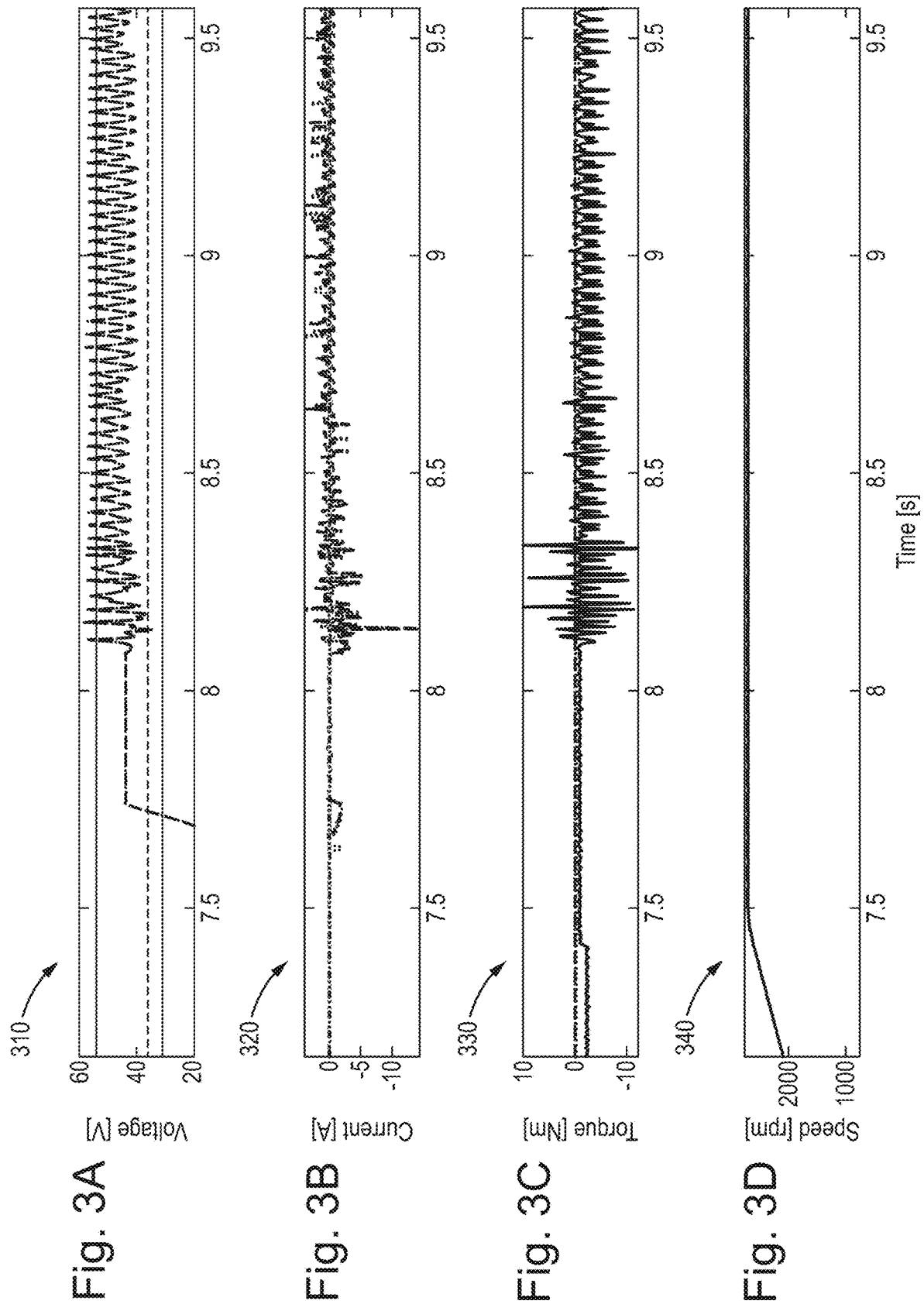
FIGS. 3A-3D illustrate power, torque, current and machine speed of an engine in a vehicle, in accordance with some examples of the disclosure.
Figure 4:
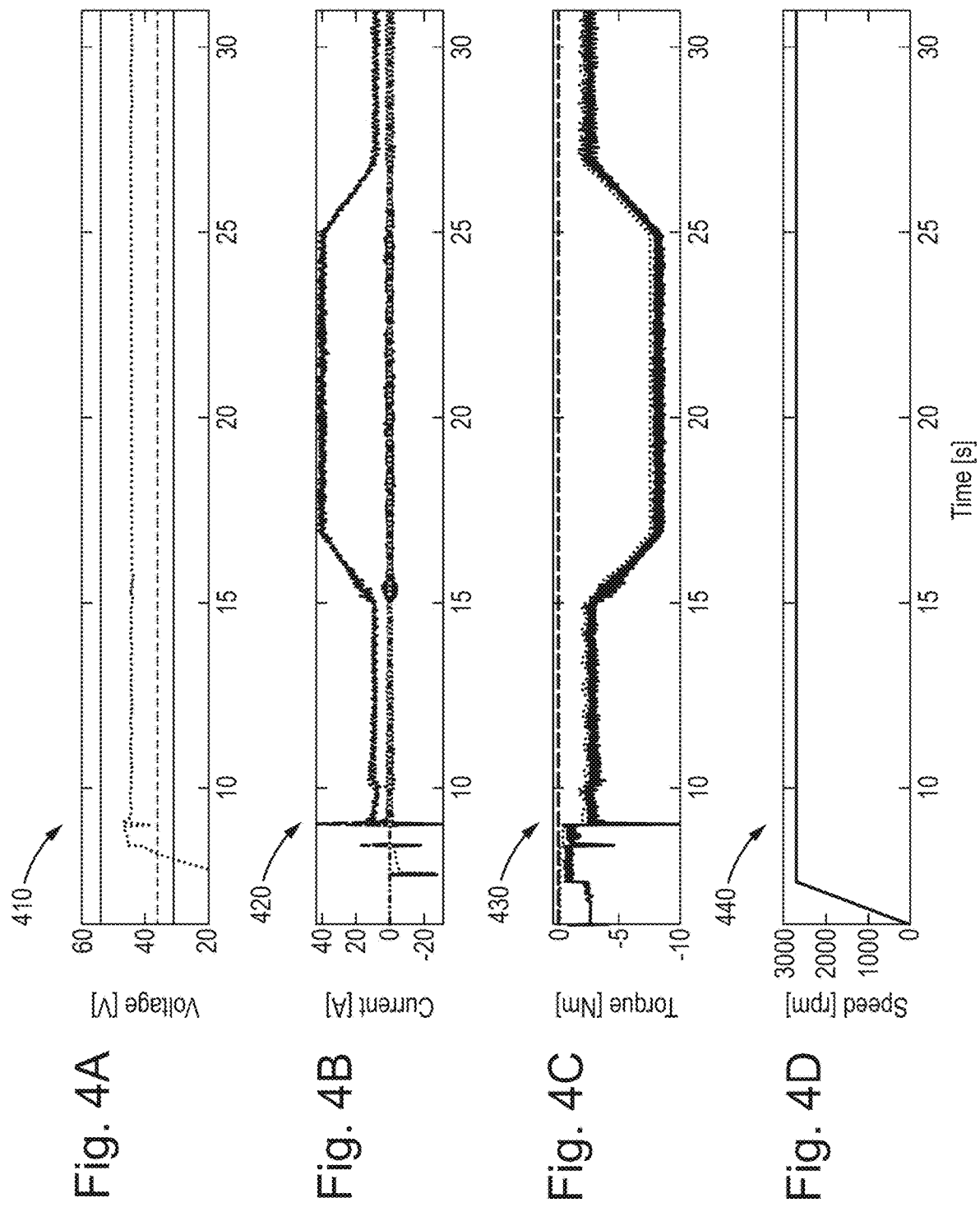
FIGS. 4A-4D illustrate power, torque, current and machine speed of an engine in a vehicle, in accordance with some examples of the disclosure.

FIG. 2 shows a block diagram representing an electrical power control system 200 for a hybrid vehicle. In the example shown in FIG. 2, the power control system 200 is for an exemplary mHEV system architecture, in accordance with at least one of the examples described herein. Shown in FIG. 2 is a belt-integrated starter-generator (BISG) 212, which is a device that may apply positive torque and assist the engine in reducing the amount of work it has to do, or, in some examples, apply negative torque to generate electrical energy. The BISG 212 may be referred to as a motor-generator. The BISG 212 is integrated into the drive train 215, along with engine 210, clutch 216, and transmission 218. In some examples, the BISG 212 replaces a conventional non-hybrid engine's low voltage (e.g., 12V) alternator. In some examples, the BISG 212 transmits torque to the engine's crankshaft when it's operating as a hybrid drive motor, and the crankshaft transmits torque back to the BISG 212 when it operates as a generator, converting kinetic energy from the moving vehicle back into electricity, operating as a conventional alternator.

In some examples, engine 210 has an exhaust system 225 comprising an eEGH 220. In the example shown in FIG. 2, a DCDC converter 230 is electrically connected to a low voltage (e.g., 12V) battery and bus 240, which is configured to supply electrical power to one or more low voltage accessories of the Hybrid Vehicle (not shown).

In the example shown in FIG. 2, the power control system 200 comprises a controller 260, e.g., an engine control module (ECM), in operational communication with each of the BISG 212, the engine 210, one or more the DCDC converters 230, 235, the eEGH 220, a plurality of heating elements 232, the LV battery and bus 240, and a pump 270. The pump 270 may be a compressor used to pump fluids such as water through one or more DCDC converters 230, 235, and the BISG 212.

The present disclosure is not limited to the set-up shown in FIG. 2. For example, controller 260 may be a stand-alone controller or any other appropriate controller of the hybrid vehicle. For example, the controller may, at least in part, be integrated with another controller of the vehicle. Furthermore, the controller 260 may be configured to operationally communicate with any one or more of the vehicle components shown in FIG. 2, and/or any other appropriate components of the vehicle. For example, controller 260 may be a stand-alone controller configured to operationally communicate with at least one HV accessory and an electric motor-generator, to control the electrical power output of the one or more DC-DC converters 230, 235.

While the example shown in FIG. 2 exemplifies the use of the control system 200 for an mHEV, it is understood that the control system 200 may be implemented on an appropriate type of hybrid vehicle, such as a plug-in hybrid electric vehicle (PHEV), having one or more high voltage circuit components and an eEGH 220. System 200 shown in FIG. 2 is configured to supply the electrical power output of DCDC converters 230, and 235 to a HV component (i.e., HV device) without a HV battery, as described in the examples above and below. In some examples, additional capacitance may be incorporated into existing components to account for the deleted HV battery. In some examples, the additional capacitance may be a separate capacitor module 250, configurable depending on a required optimised capacitance requirement. In some examples, the capacitor module is electrically connected to the control system 200, the at least one DCDC converters 230, 235, the BISG 212, LV battery and bus 240, pump 270, and the like.

A LV demand signal may include demands for power from each of the components in the LV electronics system 240. Many of the components of the LV electronics system 240 make transient demands for power which introduce transient events into the LV demand signal. For example, a user may activate a heating element, (e.g., a windshield or heated seat), and utilize power steering, these are examples of a relatively significant load and would impact the system significantly, introducing a step-change in the LV demand signal.

In many cases, the LV electronics system 240 requires a fast response time to the LV demand signal. In the example above, the user expects immediate activation of the heated windshield or power steering. More significantly, if the LV demand signal includes a demand from a critical component, e.g., power steering, the response must be immediate to avoid an unsafe situation. In some cases, a delay in responding to the LV demand signal can result in a bus collapse of the LV electronics system and, in extreme cases, a possible quit-on-road event.

In addition, transient events in the HV demand signal may be caused by a drop in catalyst temperature or an increase in emissions. Such transient events in the HV demand signal can reduce the power available from the e-machine 212, leading to a delay in the response to the LV demand signal. In addition, such transient events in the HV demand signal can cause the e-machine 212 to remove an excess amount of torque from the engine and/or ramp up demand for engine torque too quickly, which can impact drivability.

As the e-machine 212 ramps up, the torque demand on the engine 210 is increased by a corresponding amount. If the response time of the engine 210 is not sufficient, and the torque demand cannot be met immediately by the engine, this can affect the drivability of the vehicle. Noise, vibration and harshness may be increased as the engine attempts to meet the combined demands of the LV electronics system 212 and the HV device (e.g., eEGH 220).

The systems herein are configured to, and methods are provided to, modify the HV demand signal based on the LV demand signal. For example, the controller 260 may be configured to response rates, or indeed slew rates, between the first DCDC converter and the second DCDC converter (e.g., reduce or delay the HV demand signal based on the LV demands signal). For example, even for a step-change in the HV demand signal, it may be possible to delay a response to the signal by, for example, 1-10 seconds without impacting the performance of the HV device. As such, the HV demand signal can be delayed or reduced to accommodate a transient event in the LV demand signal.

In this way, a timely response to the LV demand signal can be provided by the e-machine. By providing a timely response, a bus collapse of the HV/LV electronics system 240 can be prevented, as well as an increase in engine torque demand which impacts drivability. Furthermore, the response to the LV electronics system 240 can be provided without providing an additional HV battery to meet the combined demands of the LV electronics system 240 and the HV device 220.

In some examples, the controller 260 may be configured to modify the HV demand signal by reducing a response rate of the HV device. For example, if the response to the HV demand signal can be delayed by e.g., 1-10 seconds without impacting the performance of the HV device, then the corresponding first time constant may be set in the range of 1-10 seconds. A suitable time constant can be selected in this way for any HV device. The controller 260 may be configured to apply a filter to the HV demand signal using the first time constant. The filter smooths the HV demand signal, reducing transient events in the HV demand signal.

In some examples, the controller receives a second LV demand signal. For example, the user may activate the power steering in a turning motion, or activate the heated seats for comfort. The system can determine the priority of the second LV demand signal. If the priority of the second LV demand signal is low (e.g., heated seats), the second LV demand signal can be ignored for a first time period. In some examples, upon expiry of the first time period, the first HV demand signal can be modified based on the combined first and second LV demand signal. However, if the priority of the second LV demand signal is high (e.g., power steering) the system immediately modifies the first HV demand signal based on the combined first and second LV demand signal.

In some examples, the controller can determine there is torque overhead at the e-machine 212. For example, the system may determine that opportunistic heating is possible based on the available torque at the engine, and take the opportunity to further modulate the voltage of the HV device 220. In some examples, a second HV demand signal is created based on the torque overhead, wherein the second HV demand signal has a greater response rate than the modified HV signal but a lesser response rate than the originally requested HV demand signal. For example, put another way, a 1 s response rate was requested by the HV device 220 and initially, 10 s was provided to support a LV transient load, during the LV transient load, it is determined that a 4 s response rate is achievable, therefore some opportunistic heating can be provided. In some examples, an input HV supply from the e-machine is received based on the first LV demand signal and the second HV demand signal, and a new HV output is provided to the HV device 220.

For completeness, in some examples, each of the e-machine 212 and the DCDC converter(s) 230, and 235 may include an extra capacitance. Alternatively, in some examples, the power system 200 may include an extra capacitance module 250, operably configured to deliver power to the vehicle power system from the DCDC converter(s) 230 and 235. In some examples, the e-machine 212 may include a torque reserve configured to support transient demands of the LV electronics system. In this way, by introducing extra capacitance or a reserve of torque into the system, the number and severity of transient events in the LV demand signal and HV demand signal can be further reduced. This can allow the e-machine 212 to meet the combined demands of the LV electronics system 240 and the HV device 220 without requiring a HV battery.

FIGS. 3A-3D illustrate the power consumed by exemplary vehicle devices, in accordance with some examples of the disclosure. Shown in FIGS. 3A-3D are the Voltage, as shown graph 310 in FIG. 3A, the Current, as shown by graph 320 in FIG. 3B, the Torque, as shown by graph 330 in FIG. 3C, and the Speed of the engine, as shown by graph 340 in FIG. 3D. FIGS. 3A-3D show continuous data recorded at the same arbitrary time for a vehicle system without a 48V battery (i.e., a HV hybrid battery) and no additional capacitance within the hybrid vehicle system. FIGS. 3A-3D, show that, for a given speed output from the engine in RPMs, the system attempts to maintain a balance between the two voltage limit points, shown as two solid horizontal lines at 31V and 54V, and torque. However, the system has high noise and frequently violates the voltage limit points which could result in HV or LV bus failure.

FIGS. 4A-4D illustrate the power consumed by exemplary vehicle devices in a vehicle, in accordance with some examples of the disclosure. Similar to FIGS. 4A-4D, the voltage (graph 410), current (graph 420), torque (graph 430), and speed (graph 440) of the engine are recorded over the same arbitrary time period for a vehicle system without a 48V battery (i.e., a HV hybrid battery) and additional capacitance within the hybrid vehicle system. Additional capacitance can be provided in the form of an capacitance module, such as capacitance module 140 of FIG. 1 or 250 of FIG. 2, or by selecting other vehicle components with higher capacitance than would be present for a vehicle with a HV battery. Appropriate capacitance for the capacitance module 250 can be tuned for each system, however, a capacitance module with a capacitance within the region of 100 mF can be expected to be appropriate within a few orders of magnitude. FIGS. 4A-4D also show the synchronization of the loads via the DCDCs and the improved voltage control mode operation of the e-machine (e.g., a BISG). The particular system shown in FIGS. 4A-4D, is operating in voltage control, that is to say, that the system is targeting a voltage set by the controller, and with the load synchronization via the DCDCs. It is not just the added capacitance that aids to mitigate the challenges that result as a consequence of deleting the HV battery. Put another way, the added capacitance, synchronization of the DCDCs, and voltage control all contribute to the HV battery deletion; it is the interplay of these three parts. However, it should be noted that a combination of two of these three parts, or a singular substantive part, can be sufficient to have a system stable enough without a HV battery, but for the most stable system all three are ideal.

It can be seen that even the smallest first time constant (1 second) leads to a substantial reduction in the maximum rate of change of power. The transient loads placed upon the 48V system by both the 12V system and the 48V component (e.g., eEGH) are not buffered by the battery as in a conventional system, as this is deleted in the present disclosure. In this way, a bus collapse of the HV electronics system due to the transient loads placed upon it if the DCDCs are not synchronized and do not manage the step response to the demands caused by a sudden change in the HV demand signal can be prevented, as well as any sudden increase in engine torque demand which can impact drivability. Consequently, the response to the HV device can be satisfied without providing a HV battery to meet the combined demands of the LV electronics system and the HV device.

Figure 5:
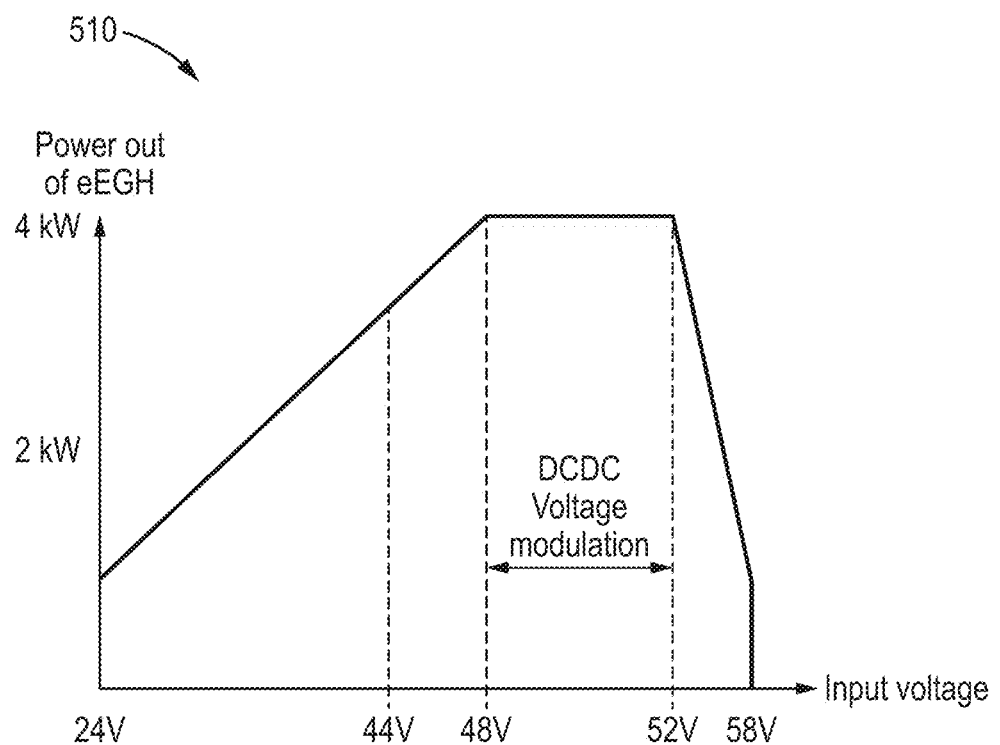
FIG. 5 illustrates a representation of power consumed by an electrical exhaust gas heater based on an input voltage, in accordance with some examples of the disclosure.

FIG. 5 depicts on graph 510 modulation of the DCDC output and thus the electrical power supplied to a HV component, such as an eEGH. In some examples, a controller, such as controller 260, may be configured to modulate the voltage of the HV device based on the LV demand signal. The controller 260 operates the DCDC converter to convert an input HV supply from the e-machine 212. The DCDC converter 235 converts the input HV supply to an output LV component for providing to the LV electronics system. The DC-DC converter 235 also converts the input HV supply to an output HV component for providing to the HV device. In some examples, the control module may be configured to modulate a voltage of the output HV component based on the LV demand signal.

A consistent eEGH output heat power and temperature can be maintained while the input voltage supplied to the eEGH is continuously modulated between a threshold depending on the device resistance, e.g., 48V and 52V. Modulating the voltage enables the 48V electrical system to maintain optimal eEGH heat power output whilst satisfying transient loads of the 12V system as these are requested. Modulation of the electrical power to the eEGH can assist in reducing the impact of transient load activation from the 12V network. Put another way, in a conventional system there would be a 48V battery to "buffer" the transient loads as they activate and deactivate. Without a battery, the BISG would not react quickly enough to satisfy such transient loads as described above; thus, the stepped response of the DCDCs (controlling both loads, 12V system and eEGH) needs to be synchronized to avoid electrical bus collapse/instability.

Figure 6:
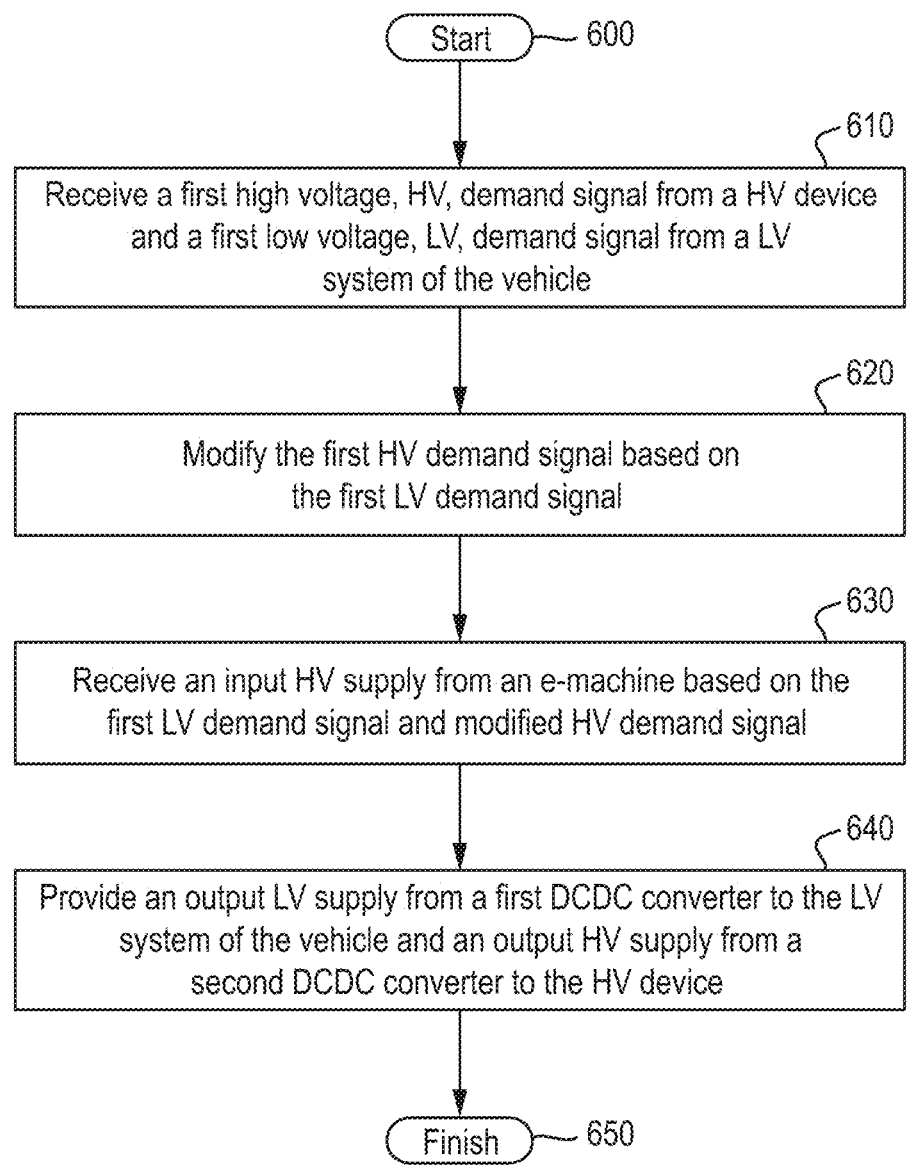
FIG. 6 illustrates an example flowchart of a method of controlling a power system in a vehicle, in accordance with some examples of the disclosure.

FIG. 6 is a flowchart representing an illustrative process 600 for controlling a DCDC converter for vehicle power control, in accordance with some examples of the disclosure. The process 600 starts at step 610. At step 610, a first high voltage, HV, demand signal is received from a HV device and a first low voltage, LV, demand signal is received from a LV system of the vehicle. In some examples, the HV device may be an electrical exhaust gas heater (eEGH). The eEGH may be configured to maintain an optimal catalyst temperature for a catalytic converter. In some examples, the eEGH may require a high power, in comparison with components of the LV electronics system. For example, the eEGH may require approximately 4 kW. As such, in some examples, the high-voltage level may be 48V. In some examples, the HV device may be e.g. a different heater, a water pump, or a motor/actuator (e.g. for a winch or lifting mechanism). The HV demand signal may include a demand from the eEGH. For example, the eEGH may demand power to increase the catalyst temperature of a catalytic converter in the vehicle. The eEGH may increase the catalyst temperature to a preset level e.g. based on the current catalyst temperature, or based on the operation of the engine, or based on the detection of emissions in the exhaust.

The low voltage (LV) electronics system includes all electronic components of the vehicle relating to vehicle control and driver interaction. For examples, the LV electronics system may include components such as power steering, external lights and indicators, windscreen wiper motors, air conditioning, driver entertainment system (e.g. radio, multimedia audio system), driver interface system (e.g. speedometer, tachometer, odometer), electric windows, central locking, immobiliser system, heaters (e.g. air heaters, window heaters, seat heaters) etc.

The LV electronics system may be arranged to receive power from a battery e.g. a lead-acid battery or a lithium-ion battery. In some examples, the low-voltage level may be 12V or 24V. Alternatively, in some examples, the low-voltage level may be 14V or 9V or any other suitable voltage level for the electronics system.

The LV demand signal may include demands for power from each of the components in the LV electronics system. Many of the components of the LV electronics system make transient demands for power which introduce transient events into the LV demand signal. For example, a user may activate a heating element, such as those comprised in heated seats, or power steering, which has no prior warning. This introduces a step-change in the LV demand signal.

In many cases, the LV electronics system requires a fast response time to the LV demand signal. In the example above, the user expects immediate activation of the window and/or wiper motor. More significantly, if the LV demand signal includes a demand from a critical component, e.g. power steering, the response must be immediate to avoid an unsafe situation. In some cases, a delay in responding to the LV demand signal can result in a bus collapse of the HV electronics system and the LV system load not being satisfied. This could lead to a quit-on-road event as the LV battery would be depleted over time and may not support the load, at which point the vehicle would stop.

At step 620, the first HV demand signal is modified based on the first LV demand signal. For example, the controller is configured to reduce or delay the HV demand signal based on the LV demands signal. For example, even for a step-change in the HV demand signal, it may be possible to delay a response to the signal by, for example, 1-10 seconds without impacting the performance of the HV device. As such, the HV demand signal can be delayed or reduced to accommodate a transient event in the LV demand signal. In this way, a timely response to the LV demand signal can be provided by the e-machine. By providing a timely response, a dangerous bus collapse of the LV electronics system can be prevented, as well as an increase in engine torque demand which impacts drivability. Furthermore, the response to the LV electronics system can be provided without providing an HV battery to meet the combined demands of the LV electronics system and the HV device.

In some examples, the controller may be configured to modify the HV demand signal using a first time constant based on a minimum required ramp rate of the HV device. For example, if the response to the HV demand signal can be delayed by e.g. 1-10 seconds without impacting the performance of the HV device, then the corresponding first time constant may be set in the range of 1-10 seconds. A suitable time constant can be selected in this way for any HV device. The controller may be configured to apply a filter to the HV demand signal using the first time constant. The filter smooths the HV demand signal, reducing transient events in the HV demand signal, which may be caused by a drop in catalyst temperature or an increase in emissions.

At step 630, an input HV supply is received from an e-machine based on the first LV demand signal and modified HV demand signal. The e-machine is coupled to an engine. The e-machine is a motor/generator configured to provide a driving torque to the engine when supplied with power and also to generate an output power when driven by the engine. The e-machine is a high voltage e-machine. That is, the output power from the e-machine may be generated at a high voltage, e.g., at 48V. In some examples, the e-machine may be a belt integrated starter generator, BISG. That is, the e-machine may be incorporated into a drivetrain of the vehicle using a belt drive. The BISG may include an integrated inverter so as to output DC power. In this way, a request is made to the e-machine to provide the power required by the LV electronics system and the HV device. The e-machine is configured to respond to the demand by increasing the torque load on the engine to generate power from the engine. In some examples, where the engine torque is currently insufficient to meet the combined power demand, the e-machine may cause the engine speed to increase in order to generate sufficient torque.

If the response time of the engine is not sufficient, transient events in the HV demand signal can reduce the power available from the e-machine, leading to a delay in the response to the LV demand signal. In addition, such transient events in the HV demand signal can cause the e-machine to remove an excess amount of torque from the engine and/or ramp up a demand for engine torque too quickly, which can impact the drivability of the vehicle. Noise, vibration and harshness may be increased as the engine attempts to meet the combined demands of the LV electronics system and the HV device.

In some examples, the HV demand signal may be modified using a second time constant based on maximum permissible ramp rate of the e-machine. The maximum permissible ramp rate may be determined based on a response time of the engine coupled to the e-machine. As the e-machine ramps up, the torque demand on the engine is increased by a corresponding amount. The second time constant can ensure that the response time of the engine is sufficient, and the torque demand can be met by the engine, preventing adverse effects on the drivability of the vehicle. Problems with noise, vibration and harshness may be prevented as the engine is able meet the combined demands of the LV electronics system and the HV device when modified by the second time constant. Moreover, the engine is able to meet the combined demand, despite the HV battery being deleted from the HV circuit.

At step 640, an output LV supply is provided from a first DCDC converter to the LV system of the vehicle and an output HV supply is provided from a second DCDC converter to the HV device. The DC-DC converter is operated to convert the output power from the e-machine to a usable power supply for the LV electronics system and/or the HV device. In some examples, the DC-DC converter may include a first HV-LV converter and a second HV-HV converter. Alternatively, the HV-LV converter and HV-HV converter may be integrated into a single DC-DC converter.

The first HV-LV converter may be configured to convert the HV output power from the e-machine to a LV power supply for the LV electronics system. For example, the first HV-LV converter may 'step down' the voltage from 48V output by the e-machine to 12V for supply to the LV electronics system.

The second HV-HV converter may be configured to convert the HV output power from the e-machine to a HV power supply for the HV device. For example, the second HV-HV converter may convert the voltage from 48V output by the e-machine to 48V for supply to the LV electronics system.

In some examples, the DC-DC converter may be operated to modulate a voltage of the output HV component based on the LV demand signal. For example, consistent output power can be maintained while continuously modulating the voltage supplied to the eEGH. This modulation can therefore adjust the current through the eEGH and thus the temperature of the eEGH, allowing the temperature to be continuously adjusted while maintaining a constant power input. In this way, the HV demand signal can be made constant within a predefined region, reducing the number of transient events in the HV demand signal. The process finishes at step 650.

Figure 7A:
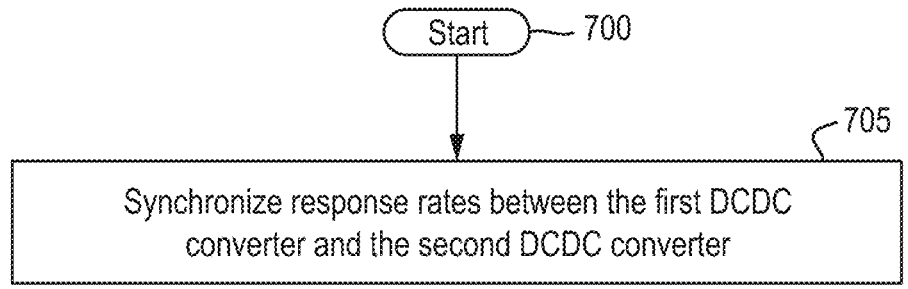
FIGS. 7A-7C illustrate methods for synchronizing and modifying power systems in a vehicle, in accordance with some examples of the disclosure.
Figure 7B:
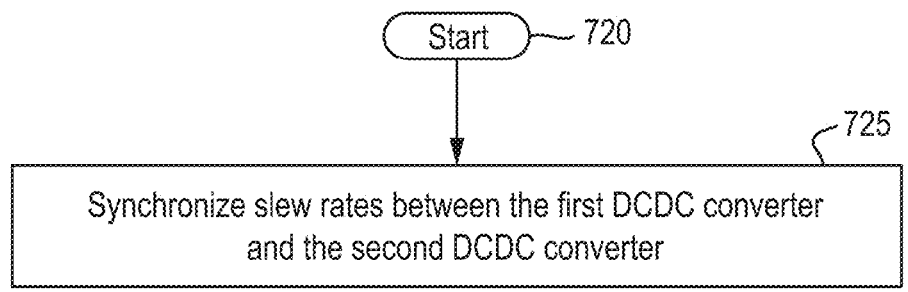
Figure 7C:
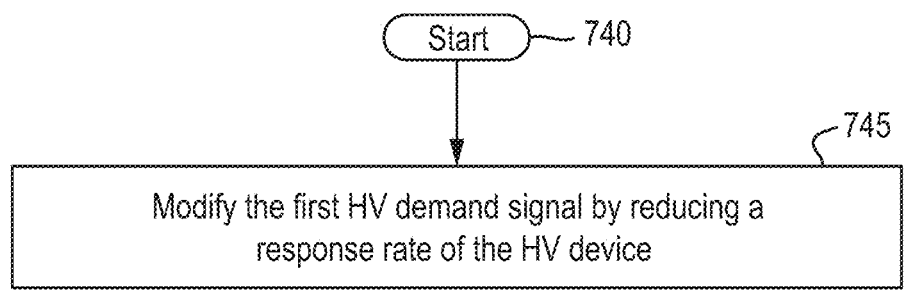

FIGS. 7A-7C are flowcharts representing illustrative processes 700, 720, and 740 for controlling a DCDC converter for vehicle power control, in accordance with some examples of the disclosure. Shown in FIG. 7A, process 700 starts at step 705 and, in some examples, continues on from process 600 of FIG. 6. At step 705, response rates between the first DCDC converter and the second DCDC converter are synchronized. Shown in FIG. 7B, process 720 starts at step 725 and, in some examples, continues on from process 600 of FIG. 6, or process 700. At step 725, slew rates between the first DCDC converter and the second DCDC converter are synchronized. Shown in FIG. C, process 740 starts at step 745 and, in some examples, continues on from process 600 of FIG. 6, process 700, or process 720. At step 725, the first HV demand signal is modified by reducing a response rate of the HV device.

FIG. 8 illustrates a flowchart representing process 800 for controlling a DCDC converter for vehicle power control, in accordance with some examples of the disclosure. Shown in FIG. 8, process 800 starts at step 810 and continues on from at least process 600. At step 810, a second LV demand signal is received. For example, the user may activate the power steering in a turning motion, or activate the heated seats for comfort.

At step 820, the system determines if the second LV demand signal has a low priority (e.g., heated seats). If the answer to step 820 is yes, process 800 continues on to step 825. At step 825, a first timer is set. At step 830, the second LV demand signal is ignored. At step 840, the system determines if the first timer has expired. If the answer to step 840 is no, process 800 reverts back to step 830, creating a wait loop in process 800.

If the answer to step 820 is no, or the answer to step 850 is yes, process 800 continues on to step 850. At step 850, upon expiry of the first time period, the first HV demand signal is modified based on the combined first and second LV demand signal. Thus, if the priority of the second LV demand signal is high (e.g., power steering) the system immediately modifies the first HV demand signal based on the combined first and second LV demand signal, if the priority is low, the LV demand signal can be ignored until the transient load can be met.

Figure 9:
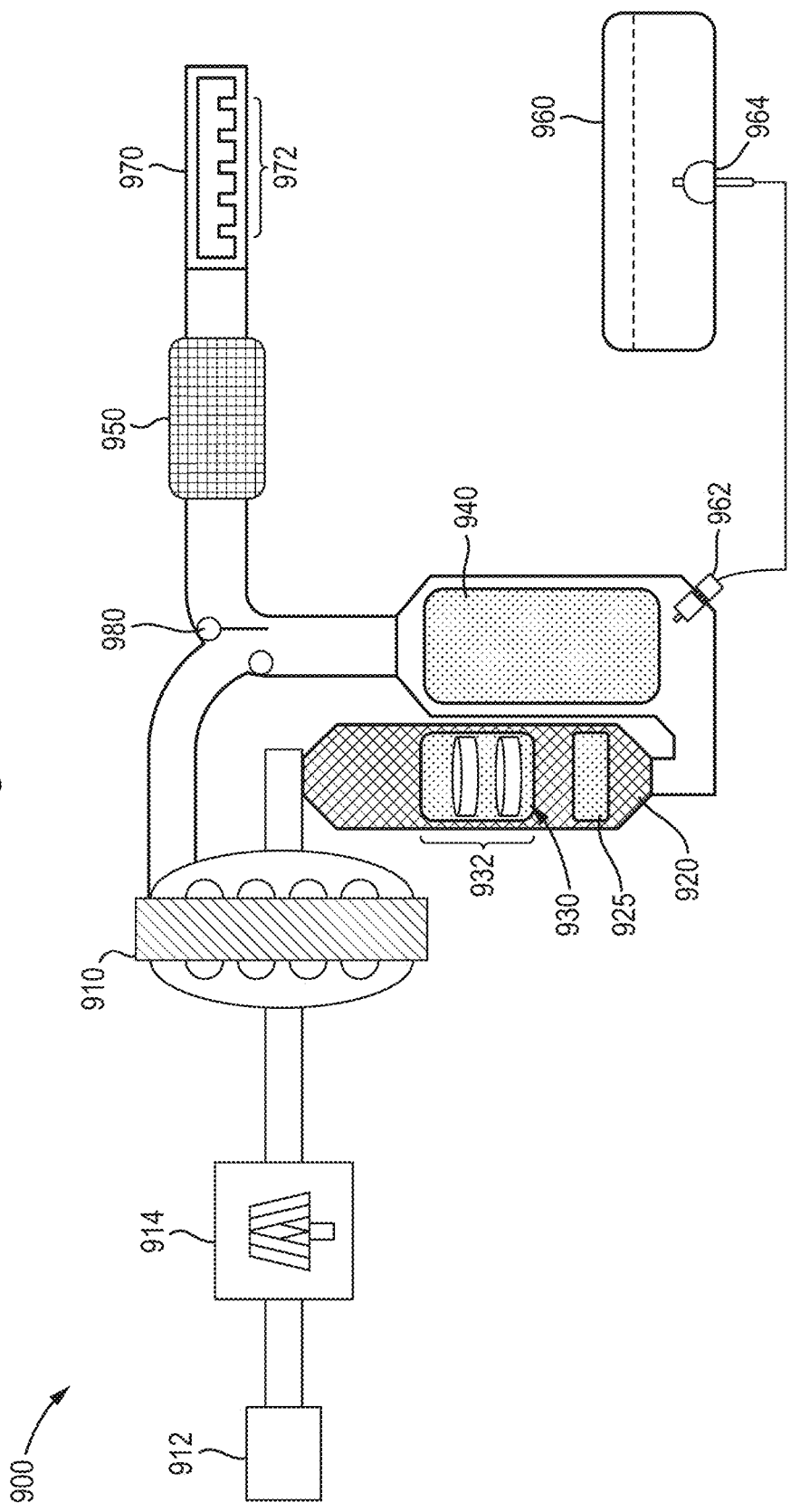
FIG. 9 illustrates an exemplary exhaust system comprising an after-treatment system, in accordance with at least one of the examples described herein.

FIG. 9 illustrates an exemplary exhaust system 900 comprising an engine 910 and an after-treatment system, comprising an exemplary eEGH in the form of an electronic catalyst (eCAT) 920. An eCAT is illustrative of a HV component that would typically require a HV battery. With the teachings of the present disclosure, HV components such as an eCAT 920 are capable of being fully utilized without the need for a HV battery. In some examples, the eCAT 920 comprises a catalyst 925 that is provided heat by a heating element 930, powered by the DCDC converter providing HV power (e.g., DCDC converter 235 of FIG. 2). In some examples, and as shown in FIG. 9, there is provided with an air-box 912 connected to a compressor 914 to draw air from the atmosphere. The airbox 912 and compressor 914 are fluidly connected to engine 910 and the after-treatment system to transfer thermal energy from a plurality of heating elements 932 disposed within the heating module 930 within the after-treatment system to the rest of the after-treatment system (e.g., to the catalyst 925). In some examples, to support local emissions regulations, additional systems such as an e-compressor 914 may be required. In particular, during a low flow exhaust gas situation, additional fans or the like to increase oxygen through the after-treatment system to assist in soot burn off may be required.

In some examples, there is a diesel particulate filter 940 downstream of engine 910. A diesel particulate filter (DPF) is a filter that captures and stores exhaust soot, coke, and/or char, collectively referred to as particulate matter. The DPF is another form of after-treatment utilized to reduce emissions from diesel cars. DPFs have a finite capacity, the trapped particulate matter periodically has to be emptied or 'burned off' to regenerate the DPF, which an eCAT may also be used to assist with. This regeneration process cleanly burns off the excess particular matter deposited in the filter, reducing the harmful exhaust emission. In some examples, the regeneration process may be initiated in response to predicting that there will be no increase in torque demand. For example, if the amount of particulate matter within the after-treatment system is determined to be above a threshold and a regeneration process is required, the after-treatment system can wait until a prediction that no increase in torque demand will be made by the driver to regenerate the after-treatment system (e.g., the DPF).

In some examples, wherein the vehicle's internal combustion engine is fueled by gasoline, there is a gasoline particulate filter (GPF), which would replace the DPF as described above, downstream of engine 910. Similar to a DPF, a GPF is a filter that captures and stores exhaust soot, coke, and/or char, collectively referred to as particulate matter. The GPF is another form of after-treatment utilized to reduce emissions from gasoline vehicles. GPFs have a finite capacity, the trapped particulate matter periodically has to be emptied or 'burned off' to regenerate the GPF, which an eCAT may also be used to assist with. This regeneration process cleanly burns off the excess particular matter deposited in the filter, reducing the harmful exhaust emission. In some examples, the regeneration process may be initiated in response to predicting that there will be no increase in torque demand. For example, if the amount of particulate matter within the after-treatment system is determined to be above a threshold and a regeneration process is required, the after-treatment system can wait until a prediction that no increase in torque demand will be made by the driver to regenerate the after-treatment system (e.g., the GPF). Alternatively, the system can wait until a relatively higher torque demand as this can help in achieving higher temperatures in the after-treatment system, e.g., using eEGH with power, supplied from the BISG, increases engine load and this can aid the regeneration process with an increase in temperature.

In some examples, there is also provided with a selective catalytic reduction (SCR) 950 system. An SCR is another emissions control technology system that injects a liquid-reductant agent through a special catalyst into the exhaust stream of engines, in particular diesel engines. The reductant source is usually automotive-grade urea, otherwise known as diesel exhaust fluid (DEF). The DEF sets off a chemical reaction that converts nitrogen oxides into nitrogen, water, and low amounts of carbon dioxide (CO2), which is then expelled through the vehicle tailpipe 970. The DEF may be stored in a DEF tank 960. The DEF may be distributed through several pumps and valves 962 and 964, as shown in FIG. 9. The number of pumps and valves 962 and 964 are for illustration purposes and additional pumps and valves 962 and 964 may be located throughout the exhaust and/or after-treatment system. The location of the pumps and valves 962 and 964 are similarly for illustration purposes and the location of the pumps and valves 962 and 964 can be different from that shown in FIG. 9.

In some examples, the exhaust system comprises several sensors and/or analysers 972 to detect substances in the the flue gas, such as oxides of nitrogen (NOx), oxides of sulfur (SOx), Particulate Matter (PM), Ammonia (NH3), as well as temperature, to ensure the final emissions are within a regulation amount. Euro 5 exhaust emission legislation and Euro 6 exhaust emission legislation, have effectively made it mandatory for DPFs, DEF, and SCRs to meet the emissions standards. However, in future emission legislation, such as Euro 7, such technology alone may not be sufficient. The systems and embodiments described herein may replace, or work in conjunction with DPFs, DEF, and SCRs and meet the future standards.

In some examples, the exhaust system comprises an exhaust gas recirculation system, which is enabled by an EGR switch 980. The EGR switch 980 enables some or all exhaust gas, or the thermal energy of the exhaust gas, to be recirculated through the exhaust system to further compound the heating effect of the heating elements 932 within the heating module 930.

Figure 10:
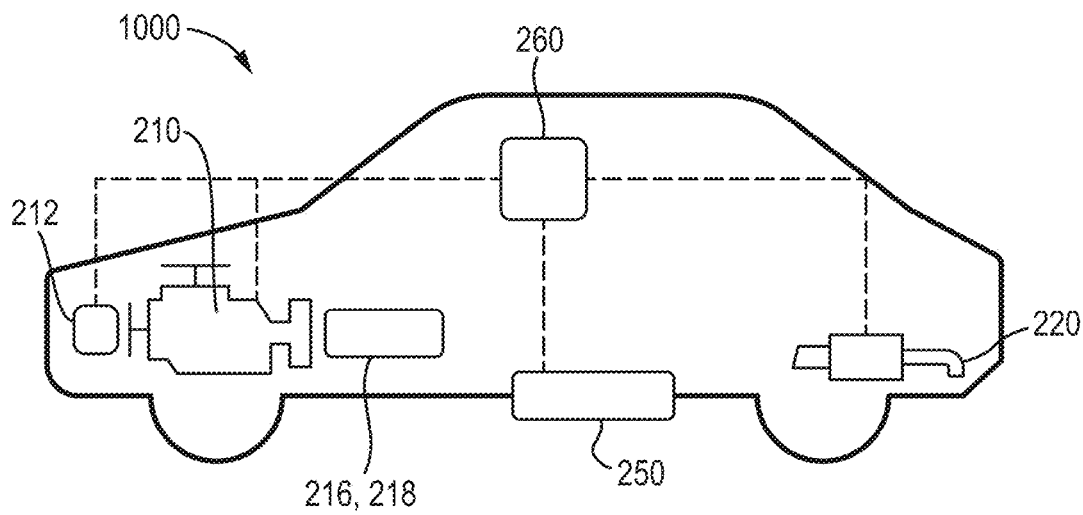
FIG. 10 illustrates a block diagram of a vehicle comprising an exemplary exhaust system, in accordance with at least one of the examples described herein.

FIG. 10 illustrates a vehicle 1000 comprising an engine 210, an exemplary exhaust system 220, a control module 260, and a optional capacitance module 250, in accordance with at least one of the examples described herein. According to some examples, there is provided vehicle 1000 comprises an exhaust after-treatment system 220 as described with reference to FIG. 2 or that of FIG. 9. In some examples, the vehicle 200 further comprises a drive train comprising a BISG 212, an engine 210, clutch 216 and transmission 218. The methods and systems described above should be considered as being possible to be implemented on vehicle 200.

Each of the systems in the vehicle are communicatively coupled via controller 260 (illustrated by the dashed line connectors). However, the present disclosure is not limited to the set-up shown in FIG. 2. For example, the controller 260 may be any appropriate type of controller, such as a stand-alone controller, or any other appropriate controller of the hybrid vehicle. For example, the controller 260 may, at least in part, be integrated with another controller of the vehicle. Furthermore, the controller 260 may be configured to operationally communicate with any one or more of the vehicle components shown in FIGS. 1-11, and/or any other appropriate components of the vehicle. For example, controller 260 may be a stand-alone controller at least partially configured to operationally communicate with at least one low voltage accessory, an electric generator, and a HV component. Furthermore, it is understood that controller 260 may be configured to carry out one or more of the above-disclosed electrical power control methods for a hybrid vehicle, as described above.

Figure 11:
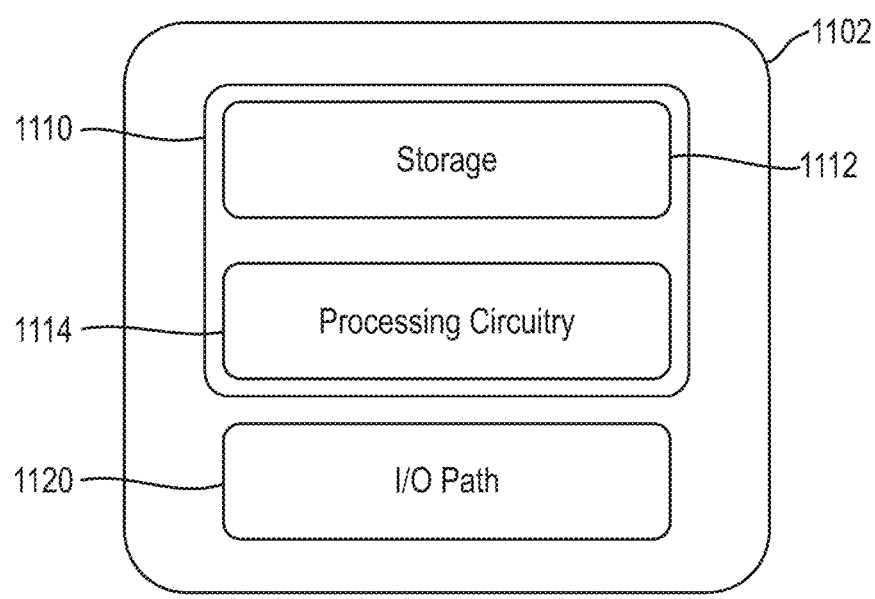
FIG. 11 illustrates a block diagram of a computing module, in accordance with some examples of the disclosure.

FIG. 11 illustrates a block diagram 1100 of computing module 1102, in accordance with some embodiments of the disclosure. In some examples, computing module 1102 may be communicatively connected to a user interface. In some examples, computing module 1102, may be the controller 1060 of the vehicle 1000 as described in FIG. 10. In some examples, computing module 1102 may include processing circuitry, control circuitry, and storage (e.g., RAM, ROM, hard disk, a removable disk, etc.). Computing module 1102 may include an input/output path 1106. I/O path 1120 may provide device information, or other data, over a local area network (LAN) or wide area network (WAN), and/or other content and data to control circuitry 1110, which includes processing circuitry 1114 and storage 1112. Control circuitry 1110 may be used to send and receive commands, requests, signals (digital and analog), and other suitable data using I/O path 1120. I/O path 1120 may connect control circuitry 1110 (and specifically processing circuitry 1114) to one or more communications paths. In some examples, computing module 1102 may be an onboard computer of a vehicle, such as vehicle 1000.

Control circuitry 1110 may be based on any suitable processing circuitry such as processing circuitry 1114. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, control circuitry 1114 executes instructions for computing module 1102 stored in memory (e.g., storage 1112).

The memory may be an electronic storage device provided as storage 1112, which is part of control circuitry 1110. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. The non-volatile memory may also be used (e.g., to launch a boot-up routine and other instructions). Storage 1112 may be subdivided into different spaces such as kernel space and userspace. Kernel space is a portion of memory or storage that is, e.g., reserved for running a privileged operating system kernel, kernel extensions, and most device drivers. Userspace may be considered an area of memory or storage where application software generally executes and is kept separate from kernel space to not interfere with system-vital processes. Kernel-mode may be considered as a mode when control circuitry 1110 has permission to operate on data in kernel space, while applications running in user mode must request control circuitry 1110 to perform tasks in kernel mode on its behalf.

Computing module 1102 may be coupled to a communications network. The communication network may be one or more networks including the Internet, a mobile phone network, mobile voice or data network (e.g., a 3G, 4G, 5G or LTE network), mesh network, peer-to-peer network, cable network, cable reception (e.g., coaxial), microwave link, DSL reception, cable internet reception, fiber reception, over-the-air infrastructure or other types of communications network or combinations of communications networks. Computing module 1102 may be coupled to a second communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

In some examples, the control circuitry 1110 is configured to carry out any of the methods as described herein. For example, storage 1112 may be a non-transitory computer-readable medium having instructions encoded thereon, to be carried out by processing circuitry 1114, which causes control circuitry 1110 to carry out a method for regenerating an after-treatment system of a vehicle. For example, the control circuitry may carry out a method comprising the steps of the appended claims.

It should be understood that the examples described above are not mutually exclusive with any of the other examples described with reference to FIGS. 1-11. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The disclosure of this invention is made to illustrate the general principles of the systems and processes discussed above and is intended to be illustrative rather than limiting. More generally, the above disclosure is meant to be exemplary and not limiting and the scope of the invention is best determined by reference to the appended claims. In other words, only the claims that follow are meant to set bounds as to what the present disclosure includes.

While the present disclosure is described with reference to particular example applications, it shall be appreciated that the invention is not limited thereto. It will be apparent to those skilled in the art that various modifications and improvements may be made without departing from the scope and spirit of the present invention. Those skilled in the art would appreciate that the actions of the processes discussed herein may be omitted, modified, combined, and/or rearranged, and any additional actions may be performed without departing from the scope of the invention.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The invention claimed is:

1. A method for vehicle power control, the method comprising:
    receiving a first high voltage, HV, demand signal from a HV device and a first low voltage, LV, demand signal from a LV system of a vehicle;
    modifying the first HV demand signal based on the first LV demand signal, using a first time constant based on a minimum required ramp rate of the HV device and applying a filter to the HV demand signal using the first time constant, and using a second time constant based on a maximum permissible ramp rate of an e-machine, wherein the second time constant is determined based on a response time of an engine coupled to the e-machine;
    receiving an input HV supply from the e-machine based on the first LV demand signal and modified HV demand signal;
    providing an output LV supply from a first DCDC converter to the LV system of the vehicle and an output HV supply from a second DCDC converter to the HV device; and
    modulating a voltage of the HV device based on the first LV demand signal to adjust current through the HV device.

2. The method of claim 1, further comprising:
    synchronizing response rates between the first DCDC converter and the second DCDC converter.

3. The method of claim 1, further comprising:
    synchronizing slew rates between the first DCDC converter and the second DCDC converter.

4. The method of claim 1, wherein the first DCDC converter and second DCDC converter are housed in a single DCDC converter unit.

5. The method of claim 1, further comprising:
    modifying the first HV demand signal by reducing a response rate of the HV device.

6. The method of claim 1, further comprising:
    determining there is torque overhead at the e-machine;
    creating a second HV demand signal based on the torque overhead, wherein the second HV demand signal has a greater response rate than the modified HV signal but a lesser response rate than the first HV demand signal; and
    receiving an input HV supply from the e-machine based on the first LV demand signal and the second HV demand signal.

7. The method of claim 1, further comprising:
    receiving a second LV demand signal;
    determining that the second LV demand signal has a low priority;
    ignoring the second LV demand signal for a first time period; and
    upon expiry of the first time period, modifying the first HV demand signal based on the combined first and second LV demand signal.

8. The method of claim 1, further comprising:
    operating a controller to selectively supply power from a capacitance module to the vehicle power system.

9. A power system for a vehicle, the power system comprising:
    a high voltage, HV, e-machine coupled to an engine;
    a HV device;
    a low voltage, LV, system of the vehicle;
    a first DCDC converter configured to convert an input HV supply from the e-machine to an output LV supply;
    a second DCDC converter configured to convert an input HV supply from the e-machine to an output HV supply; and
    a controller configured to:
        receive a first high voltage, HV, demand signal from the HV device and a first low voltage, LV, demand signal from the LV system of the vehicle;
        modify the first HV demand signal based on the first LV demand signal, using a first time constant based on a minimum required ramp rate of the HV device and applying a filter to the HV demand signal using the first time constant, and using a second time constant based on a maximum permissible ramp rate of the e-machine, wherein the second time constant is determined based on a response time of an engine coupled to the e-machine;
        instruct the first DCDC converter to provide an output LV supply to the LV system of the vehicle;
        instruct the second DCDC converter to provide an output HV supply to the HV device; and
        modulate a voltage of the HV device based on the LV demand signal to adjust current through the HV device.

10. The power system of claim 9, wherein the controller is further configured to:
    synchronize response rates between the first DCDC converter and the second DCDC converter; or synchronize slew rates between the first DCDC converter and the second DCDC converter.

11. The power system of claim 9, wherein the first DCDC converter and second DCDC converter are housed in a single DCDC converter unit.

12. The power system of claim 9, wherein the controller is further configured to:
modify the first HV demand signal by reducing a response rate of the HV device.

13. The power system of claim 9, wherein the controller is further configured to:
determine there is torque overhead at the e-machine;
create a second HV demand signal based on the torque overhead, wherein the second HV demand signal has a greater slew rate than the modified HV signal but a lesser slew rate than the first HV demand signal; and
receive an input HV supply from the e-machine based on the first LV demand signal and the second HV demand signal.

14. The power system of claim 9, wherein the controller is further configured to:
receive a second LV demand signal;
determine that the second LV demand signal has a low priority;
ignore the second LV demand signal for a first time period;
upon expiry of the first time period, modify the first HV demand signal based on the combined first and second LV demand signal.

15. The power system of claim 9, further comprising:
a capacitance module operably connectable to the vehicle power system.

16. The power system of claim 9, wherein the e-machine is a belt integrated starter generator, BISG, and wherein the HV device is an electrical exhaust gas heater, eEGH, or an electronic catalyst, eCAT.

17. A vehicle comprising the power system of claim 9.

18. A non-transitory computer-readable medium having instructions encoded thereon for vehicle power control which, when executed, carry out the method of claim 1.

\* \* \* \* \*